United States Patent
Remedios et al.

(10) Patent No.: US 7,581,745 B2
(45) Date of Patent: Sep. 1, 2009

(54) ADJUSTABLE ALUMINUM TRAILER BUNK FOR TRAILERS

(75) Inventors: Philip Remedios, Dunedin, FL (US); Mike Gee, Magnolia, AR (US)

(73) Assignee: Alcon Inc., Pittsburgh, PA (US)

( * ) Notice: Subject to any disclaimer, the term of this patent is extended or adjusted under 35 U.S.C. 154(b) by 251 days.

(21) Appl. No.: 11/473,316

(22) Filed: Jun. 23, 2006

(65) Prior Publication Data

US 2007/0045984 A1    Mar. 1, 2007

Related U.S. Application Data

(60) Provisional application No. 60/694,416, filed on Jun. 27, 2005.

(51) Int. Cl.
*B60P 3/10* (2006.01)
(52) U.S. Cl. .................................. 280/414.1; 405/7
(58) Field of Classification Search .............. 280/414.1, 280/414.3; 414/137.7, 139.4, 139.8, 537, 414/678; 114/344; 405/4, 7
See application file for complete search history.

(56) References Cited

U.S. PATENT DOCUMENTS

| | | | | |
|---|---|---|---|---|
| 3,122,245 A | * | 2/1964 | MacKusick et al. | 414/483 |
| 3,131,902 A | * | 5/1964 | Zak, Jr. | 248/354.3 |
| 3,993,324 A | * | 11/1976 | Carrick | 280/414.1 |
| 4,360,936 A | | 11/1982 | Keller | |
| 4,507,016 A | | 3/1985 | Honour, VII | |
| 4,592,694 A | | 6/1986 | Johnson | |
| 4,623,161 A | | 11/1986 | Sprague | |
| 4,715,768 A | | 12/1987 | Capps | |
| 4,893,828 A | | 1/1990 | Godbersen | |
| 4,944,633 A | * | 7/1990 | Robb | 405/3 |
| 5,002,299 A | | 3/1991 | Firehammer et al. | |
| 5,060,963 A | | 10/1991 | Godbersen | |
| 5,429,383 A | | 7/1995 | Reed | |
| 5,993,063 A | | 11/1999 | Stewart | |
| 6,113,124 A | | 9/2000 | Chambers | |
| 6,189,909 B1 | | 2/2001 | Danchuk | |
| 6,247,719 B1 | * | 6/2001 | Youmans et al. | 280/414.1 |
| 6,250,662 B1 | | 6/2001 | Poppell | |
| 2006/0024453 A1 | * | 2/2006 | Setser et al. | 428/2 |
| 2006/0181056 A1 | * | 8/2006 | Weekes | 280/414.1 |

FOREIGN PATENT DOCUMENTS

WO     8700807     2/1987

* cited by examiner

*Primary Examiner*—Anne Marie Boehler
(74) *Attorney, Agent, or Firm*—Greenberg Traurig LLP (57) ABSTRACT

Disclosed is an aluminum trailer bunk having a support housing, a base plate, an aluminum rail, and a protective covering positioned over the aluminum rail. Further disclosed is an aluminum replacement rail for a trailer, including an aluminum rail having a bottom plate and a support member, a plurality of L-brackets, and a protective covering placed over said support member.

17 Claims, 4 Drawing Sheets

ADJUSTABLE ALUMINUM TRAILER BUNK FOR TRAILERS

This application claims the benefit of the filing date of U.S. Provisional Patent Application No. 60/694,416 filed on Jun. 27, 2005, which is incorporated herein by reference in its entirety.

FIELD OF THE INVENTION

The present invention relates generally to trailer bunks. More specifically, this invention relates to boat trailer bunks.

BACKGROUND OF THE INVENTION

Traditional trailer bunks often use chemically treated 5.08 cm×10.16 cm (2 in×4 in) lumber that is covered with carpet. Mechanically attached to the treated lumber are wooden rails that extend partially along the legth of the boat trailer. These rails are typically covered with carpet in order to protect the hull of the boat that is being loaded onto the carpeted rails. The major drawback, however, of using carpeted rails and carpeted trailer bunks is that carpet begins to deteriorate after repeated exposures to water. Another disadvantage of this design is that the trailer bunk typically has a short life span since the chemically treated lumber and the wooden rails begin to decay after repeated use in an aqueous environment.

Other trailer bunks utilize chemically treated lumber with steel components that are mechanically attached to polymer rails. Polymer rails, unlike carpeted rails, do not deteriorate after repeated exposure to water. In addition to protecting the hull of the boat that is loaded onto the rail, the polymer rail also reduces the coefficient of friction between the boat hull and the rail thereby facilitating the loading and unloading of the boat onto the trailer. The disadvantage of this design, however, is that the steel components are susceptible to rusting after repeated exposure to water. Similar to the trailer bunk that is described in the preceding paragraph, this trailer bunk design also has a short life span because the chemically treated lumber, which is used as the base of the trailer bunk, begins to decay after repeated use in an aqueous environment.

Another drawback of traditional trailer bunk design is that they often have limited adjustability. Typically, the height of the trailer bunk is selected based on the anticipated bending stresses that are caused by the weight of the particular boat that will be loaded onto the trailer bunk. The angle of the trailer bunk's rail is determined by the shape of the particular boat's hull. Since these trailer bunks are secured by one or more bolts, which extend through one or more corresponding apertures on either side of the trailer bunk, the adjustability of the trailer bunk is limited because the location of the apertures are determined by the bending stresses that are exerted onto the trailer bunk as well as the dimensions of the boat's hull. In other words, a particular trailer bunk can only transport a boat having a specific weight and a specific hull design since the trailer bunk is designed only to accommodate a boat having those characteristics. If the boat trailer is to be used with a second boat having a different weight and a different hull design from the first boat, then a second set of trailer bunks would have to be used.

Because traditional trailer bunks are susceptible to decay and rust after repeated exposure to water and have a limited range of adjustability, there exists a need for an improved trailer bunk that has an improved life span as well as the ability to accommodate a variety of boat hull designs.

SUMMARY OF THE INVENTION

The invention in one embodiment provides an aluminum trailer bunk having a support housing, a base plate, an aluminum rail, and a protective covering positioned over the aluminum rail.

In an embodiment of the invention, the support housing has a base, a first wall, and a second wall. The first and second walls extend substantially vertically and define a hollow interior having an open top. Each of the first and second walls has an interior surface that is serrated and has at least one corresponding aperture that is adapted to receive a bolt or a fastener.

The base plate has a first end and a second end. Located at the first end of the base plate in one embodiment is an enlarged cylindrical head. Extending from the enlarged cylindrical head to the second end of the base plate is a serrated portion that is mechanically engaged with said serrated interior surface of the support housing.

In one embodiment, the aluminum rail has a cylindrical housing that is connected to an upper portion. The upper portion has a bottom plate, a support member that is located at a first end of the bottom plate, and an end wall located at a second end of the bottom plate. The end wall extends substantially vertically from the bottom plate. The cylindrical housing receives the enlarged cylindrical head of the base plate thereby allowing the aluminum rail to pivot.

In another embodiment, the aluminum rail also has a protective covering that is placed over the upper portion of the aluminum rail.

In yet another embodiment, the aluminum rail has a protective covering that is placed over the aluminum rail.

This invention in one embodiment provides an aluminum replacement rail for a trailer having a plurality of L-brackets that are connected to the aluminum rail. The aluminum rail has a bottom plate with a support member located at a first end, and an end wall located at a second end of the bottom plate. The end wall extends substantially vertically from the bottom plate. The L-brackets include a substantially horizontally extending first tab and a substantially vertically extending second tab. The second tab is attached to the bottom plate. A protective covering is positioned over the support member and the end wall of the aluminum rail.

DETAILED DESCRIPTION OF PREFERRED EMBODIMENTS

The accompanying figures and the description that follows set forth this invention its preferred embodiments. However, it is contemplated that persons generally familiar with trailer bunks will be able to apply the novel characteristics of the structures and methods illustrated and described herein in other contexts by modification of certain details. Accordingly, the figures and description are not to be taken as restrictive on the scope of this invention, but are to be understood as broad and general teachings. When referring to any numerical range of values, such ranges are understood to include each and every number and/or fraction between the stated range minimum and maximum. Finally, for purposes of the description hereinafter, the terms "upper", "lower", "right", "left", "vertical", "horizontal", "top", "bottom", and derivatives thereof shall relate to the invention, as it is oriented in the drawing figures.

Figure 1:
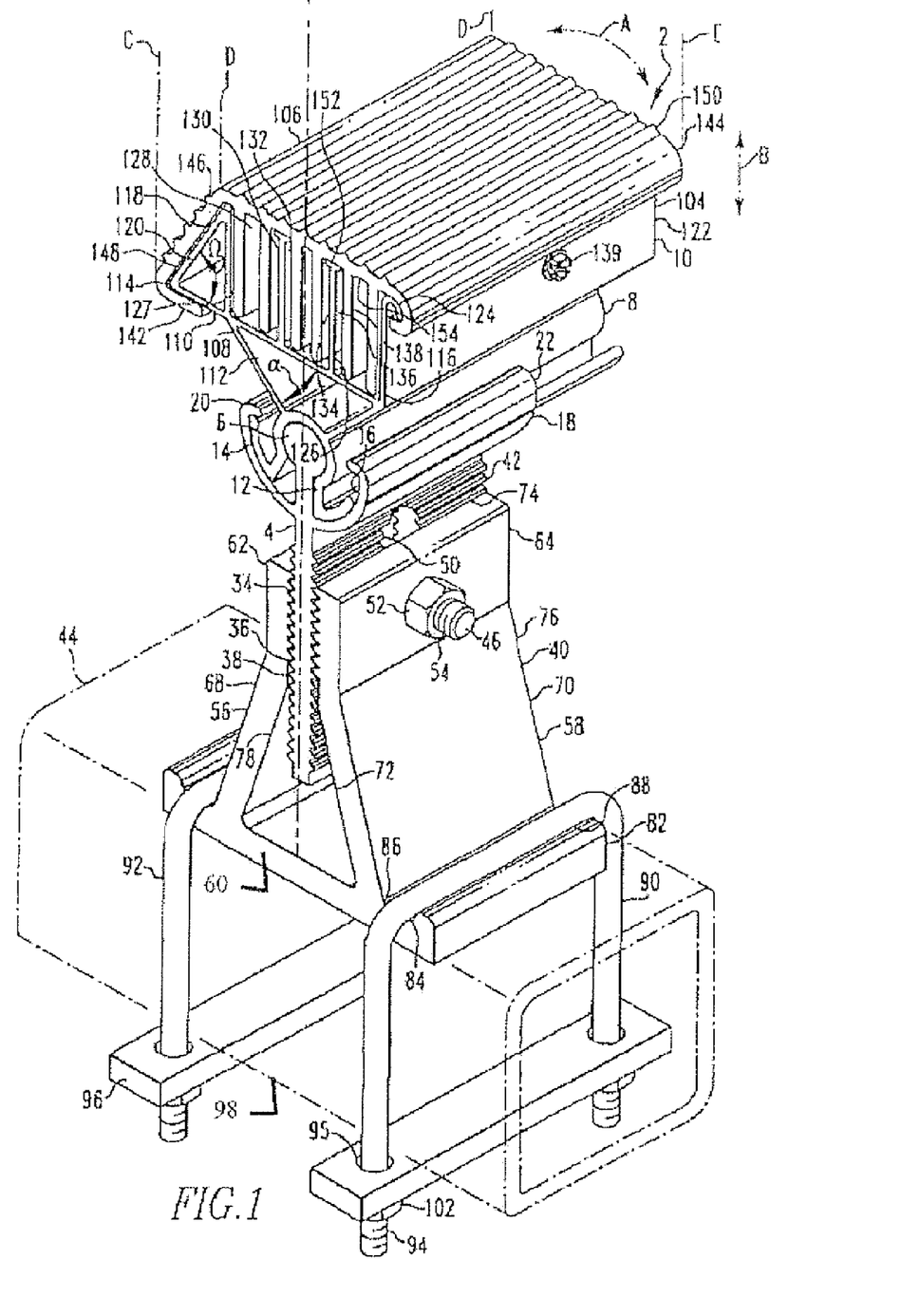
FIG. 1 is a perspective view of the aluminum trailer bunk.
Figure 2:
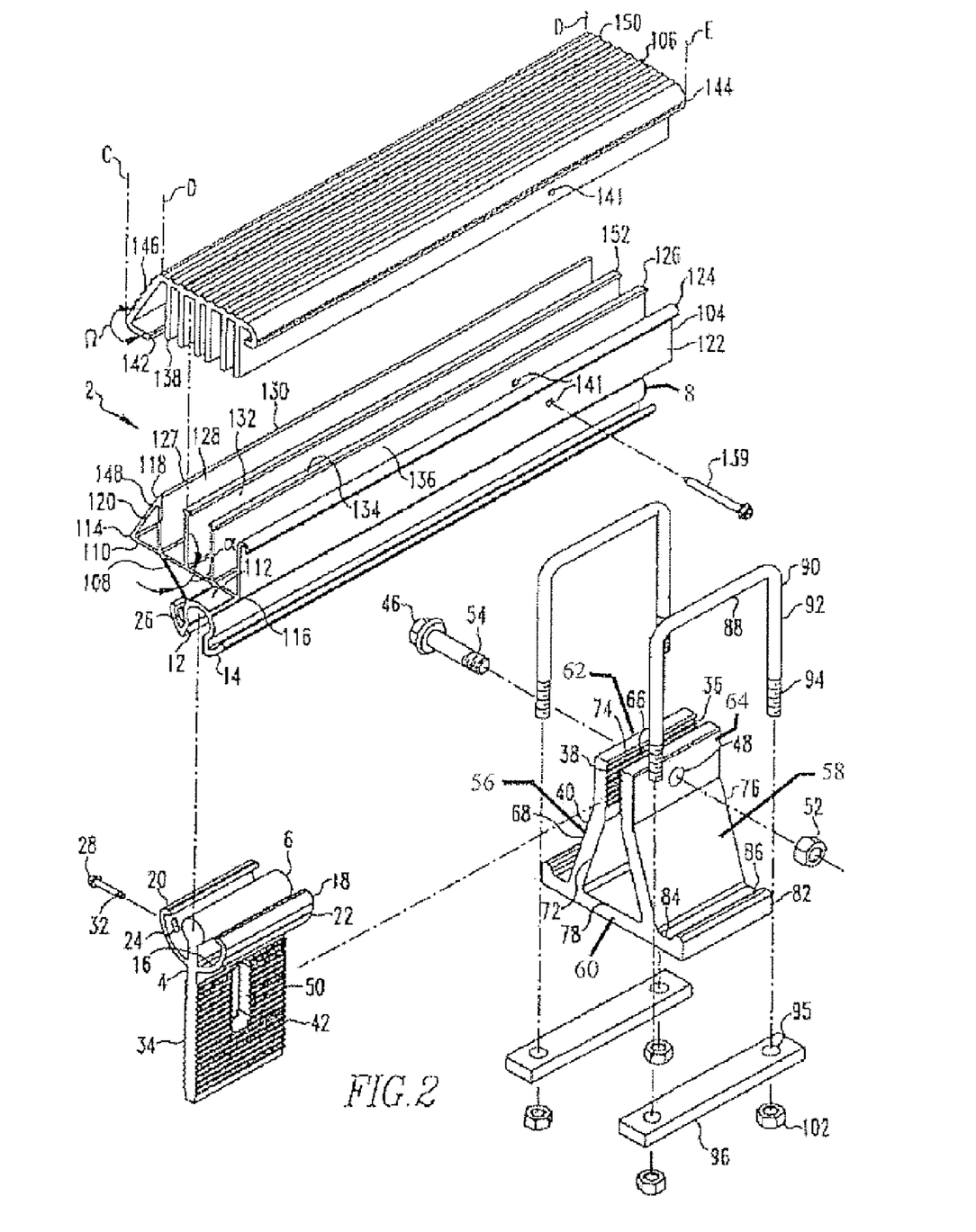
FIG. 2 is an exploded view of the invention.

As can be seen from FIGS. 1 and 2, the aluminum trailer bunk 2 includes a base plate 4 having a substantially rectangular shape. At one end of the base plate 4 is an enlarged cylindrical head 6 that is adapted to be received into a cylindrical housing 8, which is located on the aluminum rail 10. When the enlarged cylindrical head 6 of the base plate 4 is received into and affixed to the cylindrical housing 8, the aluminum rail 10 is able to pivot in the direction of arrow A. The pivoting movement of the aluminum rail 10 allows the angle of the rail 10 to be adjusted to match the hull angle of the boat that is being placed over the aluminum trailer bunk 2, which ensures that the boat is securely mounted onto the boat trailer. Extending radially from either side of the cylindrical housing is a first web 12, which is connected to a second web 14. The second web 14 is positioned adjacent to an interior surface 16 of a support tabular member 18, which extends outwardly from the base plate 4 proximate to the enlarged cylindrical head 6. The purpose of the support tabular member 18 is twofold. First, the support tabular members limit the aluminum rail's 10 range of pivotal movement. Second, the support tabular members provide an anchor point through which the bolts or fasteners are applied to fix the angle of the rail 10. In the embodiment shown in FIG. 1, the first and second tabular members 20, 22 form a substantially C- or U-shape that limits the pivotal movement of the aluminum rail 10 to about 26° degrees from the vertical line V that is depicted in FIG. 1. In other words, in this embodiment the aluminum rail 10 has a total pivotal range of up to about 52°. Each of the first and second tabular members 20, 22 have at least one aperture 24 (see FIG. 2) that corresponds to apertures 26 (see FIG. 2) that are located in the second web 14. Referring to FIG. 2, the apertures 24 in each of the first and second tabular members 20, 22 are elongated and extend substantially vertically. This design allows the aluminum rail 10 to pivot yet still be fixed to base plate 4 at a particular angle by the bolt or fasteners 28 that extend through the elongated apertures 24. By inserting at least one bolt or fastener 28 through these corresponding apertures 24, 26 and fastening the bolt or fastener 28 with a nut (not shown), the aluminum rail 10 can be fixed at a desired angle. The nut is typically threaded onto the threaded end 32 of the bolt or fastener 28. The base plate 4 can be manufactured from the Aluminum Associations' 6XXX series of aluminum alloys. In one embodiment, the base plate 4 is manufactured from the Aluminum Association's 6061 aluminum alloy. The base plate 4 can be manufactured by an extrusion, cast, or forging process.

The base plate 4 also has a serrated portion 34 that is adapted to mechanically engage with serrations 36 that are located on an interior surface 38 of the support housing 40. As can be seen from FIG. 1, the serrations 42 in the serrated portion 34 of the base plate 4 as well as the serrations 36 in the support housing 40 extend substantially perpendicular, i.e. transversely, to the trailer's cross bar 44 (see FIG. 1). Unlike traditional trailer bunks, the serrated portion 34 of the base plate 4 allows the height of the aluminum rail 10 to be adjusted in the direction of arrow B thereby allowing the trailer bunk 2 to accommodate a variety of boat hull designs. Additionally, when compared to traditional trailer bunks the aluminum trailer bunk that is disclosed in this invention is able to support a greater load since the base plate 4 of the aluminum trailer bunk 2 is serrated and is mechanically coupled to the serrated interior 38 of the support housing 40. In addition to the serrations 36, 42, the load is also supported by at least one bolt or fastener 46 that extends through apertures 48 located in the support housing 40 and the aperture 50 located on the base plate 4 of the aluminum trailer bunk 2. As can be seen from FIG. 2, the aperture 50 that is located on the base plate 4 is elongated thereby allowing the height of the base plate 4 to be adjusted. The bolt or fastener 46 is held in place by a nut 52 that is threaded onto a threaded end 54 of the bolt or fastener 46.

As shown in FIGS. 1 and 2, the support housing 40 has a substantially triangular shaped lower portion having a first lower wall 56 and a second lower wall 58 that extends upward substantially vertically from a substantially horizontally extending base 60. Extending upward and substantially vertically from the lower first wall 56 is a first upper wall 62. Extending upward substantially vertically from the lower second wall 58 is a second upper wall 64. In the embodiment that is depicted in FIGS. 1 and 2, the first upper wall 62 and the second upper wall 64 each have an interior surface 66 that is serrated. For clarity, the first lower wall 56 and the first upper wall 62 shall collectively be referred to as the first wall 68, while the second lower wall 64 and the second upper wall 58 shall be collectively referred to as the second wall 70. The first wall 68 and the second wall 70 define a hollow interior 72 into which the serrated base plate 4 is inserted. The serrated base plate 4 can either be received through the top 74 of the support housing 40 or through the front 76 or back 78 of the support housing 40. Once the base plate 4 is positioned within the hollow interior 72, the base plate 4 is mechanically coupled to the serrations 36 that are located on the interior surface 66 of the first and second walls 68, 70.

In FIGS. 1 and 2, the base plate 4 is mechanically coupled to the serrated interior surface 66 of the first and second upper walls 62, 64. The first and second upper walls 62, 64 have at least one aperture 48 that corresponds to the aperture 48 located in the opposite upper wall. The aperture 48 is adapted to receive a bolt or fastener 46, which provides additional load bearing support to the aluminum trailer bunk 2. The bolt or fastener 46 is held in place by a nut 52 that is threaded onto the threaded end 54 of the bolt or fastener 46. Even though FIG. 1 depicts the aperture 48 as being located in the first and second upper walls 62, 64, this is not meant to be limiting since the aperture 48 can also be located in the lower first and second walls 56, 58 of the support housing 40. The support housing 40 could also have a plurality of apertures 48 and not depart from the scope of this invention. Extending substantially laterally from the base 60 of the support housing 40 adjacent to the lower first and second walls 56, 58 are tabular members 82 that are used to anchor the aluminum trailer bunk 2 to the boat trailer's cross bar 44. The support housing 40 can be manufactured from the Aluminum Association's 6XXX series of aluminum alloys. In one embodiment, the support housing 40 is manufactured from the Aluminum Association's 6061 aluminum alloy. The support housing 40 can be manufactured by an extrusion, cast, or forging process.

Each tabular member 82 depicted in FIGS. 1 and 2 has a recess 84 that extends substantially along the entire length of the top surface 86 of the tabular member 82 adjacent to the first lower wall 56 and the second lower wall 58. As can be seen from these figures, the recess 84 extends across the top surface 86 of the tabular member 82 substantially perpendicular to the cross bar 44. In this embodiment, the recesses 84 are adapted to receive the base 88 of a U-bracket 90. In another embodiment, however, the tabular members 82 lack the recesses 84 and the base 88 of the U-bracket 90 is positioned adjacent to the top surface 86 of the non-recessed tabular member 82. As shown in FIG. 1, the arms 92 of the U-bracket 90 extend downward substantially vertically on either side of the trailer's cross bar 44. Each arm 92 has a threaded end 94 that is received into an aperture 95 that is located on the support plate 96 that is located adjacent to the bottom surface 98 of the cross bar 44. As can be seen from FIG. 1, the support plates 96 extend transversely to the cross bar 44. A nut 102 is threaded onto the threaded ends 94 of the U-bracket 90 thereby securing the U-bracket 90 and consequently the aluminum trailer bunk 2 to the cross bar 44. Even though FIG. 1 depicts the U-brackets 90 as being mechanically affixed to the support plate 96, the U-brackets 90 can also be welded to the support plate 96. In one embodiment, the U-brackets 90 and the support plates 96 are manufactured from stainless steel.

Referring to FIGS. 1 and 2, the aluminum rail 10 includes a cylindrical housing 8 that receives the enlarged cylindrical head 6 of the base plate 4 and an upper portion 104 onto which the protective cover 106 is attached. The cylindrical housing 8 and the upper portion 104 of the aluminum rail 10 are connected by a support web 108 that has a substantially triangular shape. In the embodiment depicted in FIGS. 1 and 2, the support web 108 connects the bottom plate 110 of the upper portion 104 of the aluminum rail 10 to the top of the cylindrical housing 8. In the embodiment that is depicted in FIGS. 1 and 2, the support web 108 has an angle α of about 45°. When the aluminum rail 10 is resting on the support tabular member 18, the support web 108 is the contact area between the aluminum rail 10 and the support tabular member 18. In FIG. 1, the triangular shaped support web 108 has a hollow interior 112 thereby reducing the total weight of the aluminum rail 10.

The upper portion 104 of the aluminum rail 10 has a bottom plate 110 having a first end 114 and a second end 116. Located at the first end 114 is a support member 118. In the embodiment that is depicted in FIG. 1, the support member 118 is an angular gusset having a hollow interior 120. Even though FIG. 1 depicts the support member 118 as having a hollow interior 120, however, a support member 118 having a solid interior does not depart from the teachings of this invention. Located at the second end 116 and extending upward substantially vertically from the bottom plate 110 is an end wall 122 with an outwardly curling end 124. At least one fin 126, which extends upward substantially vertically from the bottom plate 110, is located between the first and second ends 114,116. Referring to FIGS. 1 and 2, the two substantially vertically extending fins 126 define three pockets 127. The first pocket 128 is located between the support member 118 at the first end of the aluminum rail 10 and the first fin 130. The second pocket 132 is located between the first fin 130 and the second fin 134. The third pocket 136 is located between the second fin 134 and the end wall 122 at the second end of the aluminum rail 10. The aluminum rail 10 can have more than three pockets if three or more fins 126 are positioned between the support member 118 and the end wall 122. These pockets are adapted to receive the protective cover's 106 support ribs 138, which extend substantially downward parallel to the fins 126. In one embodiment, the aluminum rail 10 only has one pocket that is defined by the support member 118 and the end wall 122. The aluminum rail 10 can be manufactured from the Aluminum Associations' 6XXX series of aluminum alloys. In one embodiment, the aluminum rail 10 is manufactured from the Aluminum Association's 6061 aluminum alloy. The aluminum rail 10 can be manufactured by an extrusion, cast, or forging process.

As can be seen from FIG. 1, a protective covering 106 is placed over the top of the aluminum rail's 10 upper portion 104. In other words, the protective covering 106 is placed over the support member 118, the fins 126, and the end wall 122. The protective covering 106 is secured to the upper portion 104 of the aluminum rail 10 by at least one bolt or screw 139 that extends through one or more corresponding apertures 141 that are located in the end wall 122, the fins 126, and the support ribs 138. Typically, the head of the bolt or screw will be positioned adjacent to the end wall 122. In another embodiment, the bolt or screw 139 extends through one or more apertures 141 located only on the end wall 122 and the support ribs 138. In yet another embodiment, the bolt or screw 139 extends through one or more apertures 141 located in the protective cover 106, the support member 118, and the support ribs 128.

The protective cover 106 includes a first portion 146, which is positioned over and adjacent to the outer surface 148 of the support member 118. As can be seen from FIG. 1, the first end 142 of the protective covering 106 wraps around the support member 118. The protective covering 106 also includes a second portion 150 that is positioned over the ends 152 of the fins 126 and over the outwardly curling end 124 of the end wall 122. Extending downward substantially vertically from the bottom 154 of the second portion 150 are the protective covering's 106 support ribs 138, which are received into the pockets 128, 132, 136 that are defined by the first and second fins 130, 132 as described in the preceding paragraphs. Referring to FIG. 1, the second end 144 of the protective covering 106 wraps around the end wall's 122 curled end 124.

Figure 4:
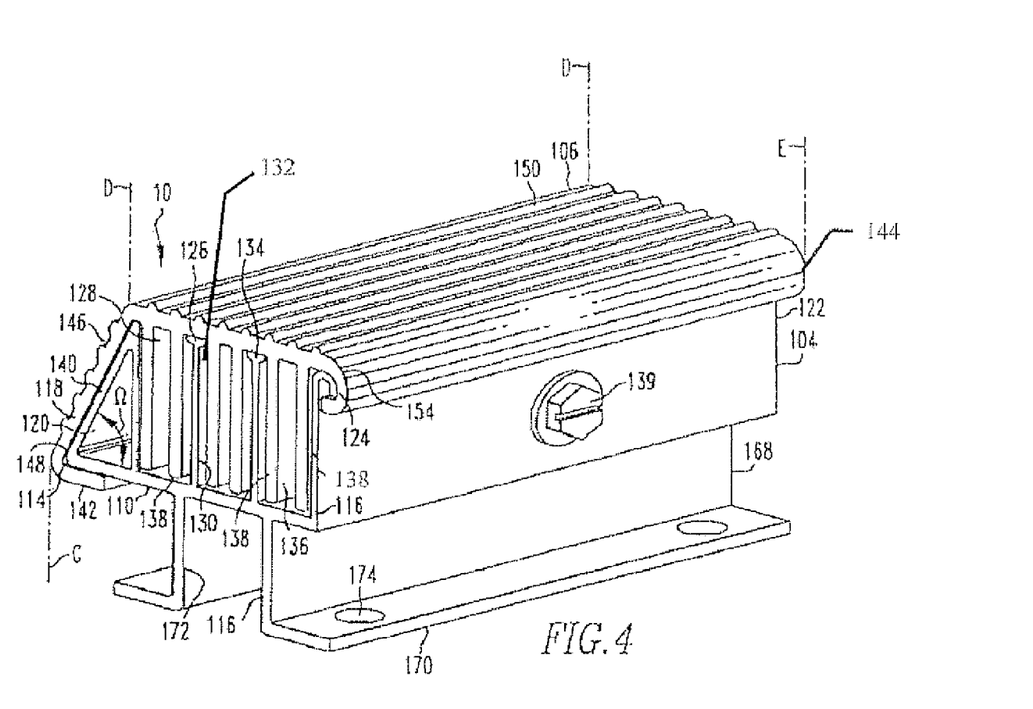
FIG. 4 is a perspective view of a replacement rail that is disclosed in this invention.

Referring to FIGS. 1, 2, and 4, the distance between C and D is about 4.98 cm (1.96 in) and the distance between D and E is about 7.21 cm (2.84 in). In the embodiment shown in FIG. 1, the angular gusset has an angle Ω of about 45°. In one embodiment, the protective covering 106 is manufactured from santoprene, Pvc, or polypropelene. In another embodiment, the protective covering 106 is extruded as a single piece. This, however, is not meant to be limiting since other methods of making the protective covering 106 can also be used without departing from the teachings of this invention. Unlike traditional trailer bunks that use carpet as the protective covering, the santoprene protective covering does not deteriorate rapidly after repeated exposure to water. Additionally, in order to increase the usefulness of the disclosed invention in the dark, the protective covering 106 may also contain an additive that causes the protective covering 106 to glow in the dark thereby increasing the visibility of the aluminum rail 10 during low light conditions. For example, glow pellets may be added to the protective covering 106 to cause the protective covering 106 to glow or luminesce after the glow pellets have been exposed to a light source.

Figure 3:
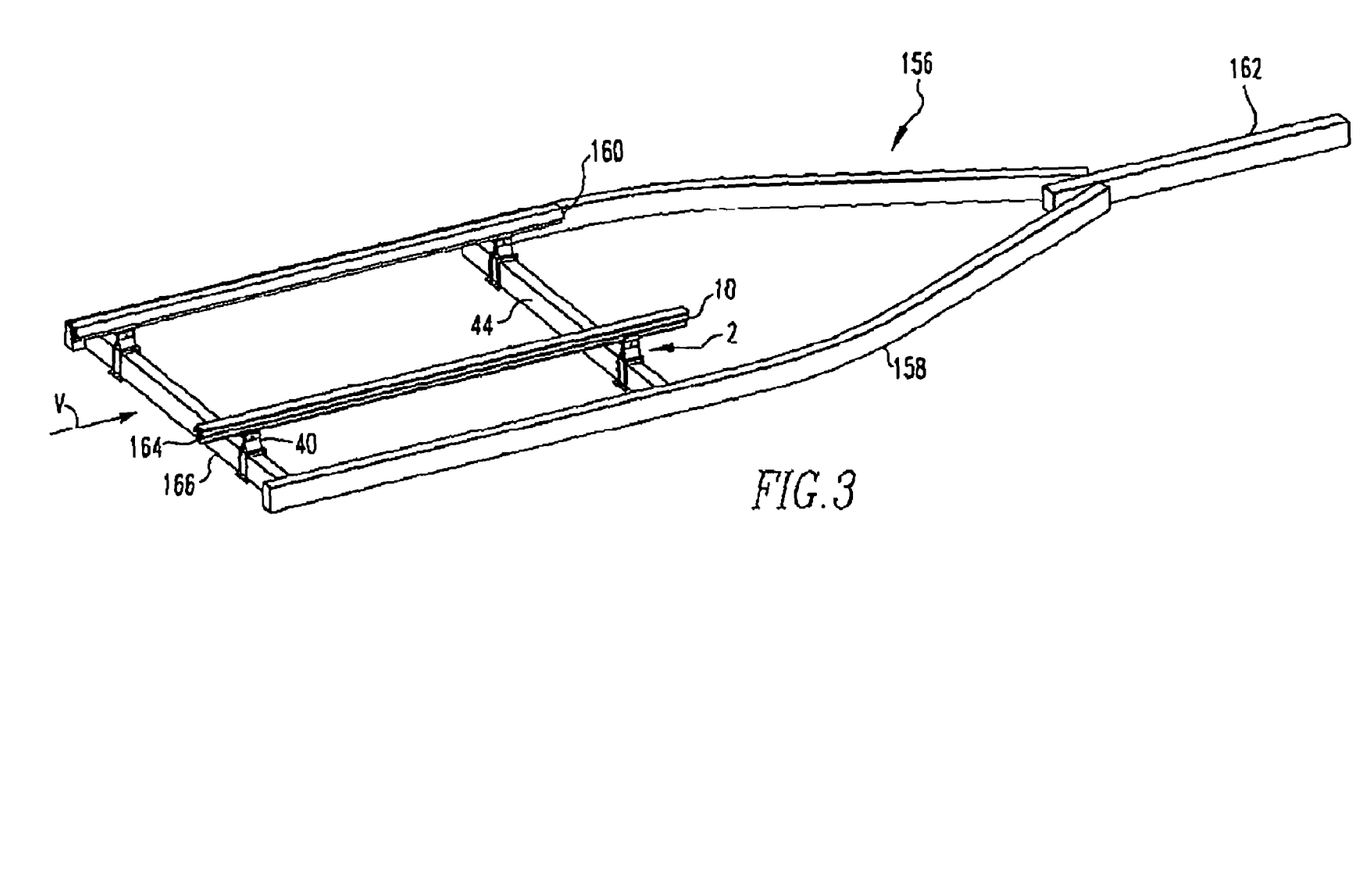
FIG. 3 is a schematic of a boat trailer having the aluminum trailer bunk disclosed in this invention.

FIG. 3 depicts a boat trailer 156 having the aluminum trailer bunk 2 that is described in the preceding paragraphs. A typical boat trailer 156 comprises a frame 158 and one or more cross bars 44 that extend substantially perpendicular to the frame 158 of the boat trailer 156. As can be seen from this figure, the aluminum rails 10 extend substantially perpendicular to the boat trailer's cross bar 44. In other words, the aluminum rails 10 extend substantially parallel to the frame 158 of the boat trailer 156. The aluminum rails 10 have a third end 160 that is near the front 162 of the boat trailer 156 and a fourth end 164 that is near the back 166 of the trailer 156. The actual length of the aluminum rail 10 may be any length so long as there are a sufficient number of support housings 40 supporting the aluminum rail 10. Ideally, the support housings 40 are spaced no more than about 1.83 m (6 ft) apart.

As described above and as depicted in FIGS. 1 and 2, a pair of U-brackets 90 are used to secure the aluminum trailer bunks 2 to the cross bars 44. The base 88 of the U-brackets 90 are received into a recess 84, which extend across a top surface 86 of the tabular members 82 that extend from the base 60 of the support housing 40. The recess 84 extends substantially parallel to the frame 158 of the boat trailer 156 and perpendicular to the boat trailer's 156 cross bar 44. The threaded ends 94 of the U-brackets 90 extend through a support plate 96 and a nut 102 is threaded onto the threaded ends 94 to ensure that the aluminum trailer bunk 2 is secured to the cross bars 44. As shown in FIG. 3, the boat is loaded onto the boat trailer 156 in the direction of arrow V. The protective cover 106 extends from about 0.97 cm (0.38 in.) to about 1.27 (0.5 in.) beyond the third and/or fourth ends 160, 164 of the aluminum rail 10 in order to insure that the boat hull does not come into contact with the aluminum rail 10 during loading. The position of the aluminum trailer bunks 2, the height of the aluminum rails 10 as well as the angle of the rails 10 is adjusted to match the dimensions of the boat hull that will be loaded onto the boat trailer 156.

In one embodiment, the aluminum trailer bunk 2 is mounted on the frame 158 of the boat trailer 156 rather than on the cross bars 44. Unlike the U-brackets 90 depicted in FIGS. 1 and 2, the U-brackets 90 that secure the support housing 40 to the boat trailer 156 in this embodiment are positioned transversely to the boat trailer's 156 frame 158. In other words, the arms of the U-brackets 90 extend downward substantially vertically on either side of the trailer's frame 158 and are received into the support plates 96, which extend substantially perpendicular to the frame 158 of the boat trailer 156. Accordingly, the tabular members 82 in this embodiment are not located adjacent to the lower first or second walls 56, 58, rather the tabular members 82 extend from the front and back 76, 78 of the support housing 40. As with the previously described embodiments, a nut 102 is threaded onto the threaded ends 94 of the U-brackets 90 to secure the U-brackets 90 to the support plates 96. Other than these differences, the aluminum trailer bunk 2 in this embodiment is identical in structure to the aluminum trailer bunk 2 described in the preceding paragraphs.

In another embodiment the aluminum trailer bunk 2 lacks the support tabular members 18.

FIG. 4 depicts another embodiment of the aluminum trailer bunk 2. In this embodiment, the aluminum rail 10 lacks the cylindrical housing 8 and the support web 108 that connects the cylindrical housing 8 to the upper portion 104 of the aluminum rail 10. Because this particular embodiment is designed as a replacement rail to an existing bunk rail on a boat trailer, a pair of L-brackets 168 having a substantially horizontally extending first tab 170 and a substantially vertically extending second tab 172 replaces the cylindrical housing 8 and the support web 108. As can be seen from FIG. 4, the second tab 172 connects the bottom plate 110 of the upper portion 104 of the aluminum rail 10 to the first tab 170. The first tab 170 has at least one aperture 174 through which a bolt or fastener (not shown) is inserted in order to secure the aluminum rail 10 to the frame of the boat trailer. The bolt or fastener is held in place by a nut that is threaded onto the threaded end of the bolt or fastener. Even though FIG. 3 depicts the first tab 170 as being substantially horizontal and the second tab 172 as being substantially vertical, the first and/or second tabs 170, 172 could also be substantially angled so that the upper portion 104 of the aluminum rail 10 is oriented to match the particular dimensions of a boat's hull.

As can be seen from this FIG. 4, the upper portion 104 of the aluminum rail 10 is in structural configuration to the aluminum rail 10 depicted in FIGS. 1 and 2. As in FIG. 1, the upper portion 104 of the aluminum rail 10 depicted in FIG. 3 includes a bottom plate 110 having a first end 114 and a second end 116. Located at the first end 114 is a support member 118. In this particular embodiment, the support member 118 is an angular gusset having a hollow interior 120. As described above, however, the support member 118 could also have a solid interior and not depart from the teachings of this invention. Located at the second end 116 and extending upward substantially vertically from the bottom plate 110 is an end wall 122 with an outwardly curling end 124. Between the first and second ends 114, 116 is at least one fin 126, which extends upward substantially vertically from the bottom plate 110 of the aluminum rail 10. In the embodiment that is shown in FIG. 4, the first and second fins 130, 134 define three pockets. The first pocket 128 is located between the support member 118 at the first end 114 of the aluminum rail 10 and the first fin 130. The second pocket 132 is located between the first fin 130 and the second fin 134. The third pocket 136 is located between the second fin 134 and the end wall 122 at the second end 116 of the aluminum rail 10. These pockets are adapted to receive the protective cover's 106 support ribs 138, which extend substantially downward parallel to the fins 126. The aluminum rail 10 can be manufactured from the Aluminum Associations' 6XXX series of aluminum alloys. In one embodiment, the aluminum rail 10 is manufactured from the Aluminum Association's 6061 aluminum alloy. The aluminum rail 10 can be manufactured by an extrusion, cast, or forging process.

Similar to the protective covering 106 described above, the protective covering 106 in FIG. 4 is secured to the upper portion 104 of the aluminum rail by at least one bolt or screw 139 that extends through the end wall 122, the fins 126, and the support ribs 128. Typically, the head of the bolt or screw will be positioned adjacent to the end wall 122. In another embodiment, the bolt or screw extends through the end wall 122 and the support ribs 138. In yet another embodiment, the screw or bolt extends through the protective cover 106, the support member 118, and the support ribs 138. The protective cover 106 includes a first portion 146, which is positioned over and adjacent to the outer surface 148 of the support member 118. As can be seen from FIG. 1, the first end 142 of the protective covering 106 wraps around the support member 118. The protective covering 106 also includes a second portion 150 that is positioned over the ends 152 of the fins 126 and over the outwardly curling end 124 of the end wall 122. Extending downward substantially vertically from the bottom 154 of the second portion 150 are the protective covering's 106 support ribs 138, which are received into the pockets 128, 132, 136 that are defined by the first and second fins 130, 132 as described in the preceding paragraphs. As can be seen in FIG. 4, the second end 144 of the protective covering 106 wraps around the end wall's 122 curled end 124. The protective cover 106 typically extends from about 0.97 cm (0.38 in.) to about 1.27 (0.5 in.) beyond the third and/or fourth ends 160, 164 (see FIG. 3) of the aluminum rail 10 in order to insure that the boat hull does not come into contact with the aluminum rail 10 during loading.

Referring to FIG. 4, the distance between C and D is about 4.98 cm (1.96 in) and the distance between D and E is about 7.21 cm (2.84 in). In the embodiment shown in FIG. 4, the angular gusset has an angle $\Omega$ of about 45°. The protective covering 106 could be manufactured from Santoprene, PVC or polypropelene. In another embodiment, the protective covering 106 is extruded as single piece. This, however, is not meant to be limiting since other methods of making the protective covering 106 can also be used without departing from the teachings of this invention. Unlike traditional trailer bunks that use carpet as the protective covering, the Santoprene protective covering does not deteriorate rapidly after repeated exposure to water. Additionally, in order to increase the usefulness of the disclosed invention in the dark, the protective covering can contain an additive which causes the protective covering to glow in the dark thereby increasing the visibility of the aluminum trailer bunk during low light conditions. As described in the preceding paragraphs, the additive can be glow pellets that allow the protective covering to luminesce after the glow pellets have been exposed to a light source.

Having described the presently preferred embodiments, it is to be understood that the invention may be otherwise embodied within the scope of the appended claims.

What is claimed is:

1. An adjustable aluminum trailer bunk comprising:
  a support housing comprising,
    a base,
    a first wall and a second wall connected to the base,
      each of the first and second walls being substantially flat and extending substantially vertical to define a hollow interior having an open top,
      each of the first and second walls having a serrated interior surface and at least one corresponding aperture being configured to receive a bolt;
  a non-rotationally adjustable base plate being substantially flat comprising,
    a first end and a second end,
    an enlarged cylindrical head at the first end,
    a serrated portion being configured to cooperate with the serrated interior surface of the first and the second walls of the support housing, wherein the serrated portion extends from the enlarged cylindrical head to the second end, wherein the serrated portion being configured to be received into the hollow interior of the support housing at a predetermined location and to engage the serrated interior surface of the support housing, thereby connecting the base plate to the support housing at the predetermined location, and
    at least one aperture being configured to receive the bolt, thereby allowing the base plate to be adjusted relative to the support housing; and
  a pivotal aluminum rail comprises,
    a cylindrical housing being configured to receive the enlarged cylindrical head of the non-rotationally adjustable base plate such that the pivotal aluminum rail pivots relative to the non-rotationally adjustable base plate and the support housing, and
    a protective covering placed over at least a portion of the pivotal aluminum rail.

2. The adjustable aluminum trailer bunk according to claim 1 wherein the open top comprises a gap and a portion of the gap closes as a nut threaded on the bolt is tightened causing the nut and the bolt to draw the first wall and the second wall towards each other.

3. The adjustable aluminum trailer bunk according to claim 1 wherein the bolt only laterally retains the non-rotationally adjustable base plate relative to the support housing.

4. The adjustable aluminum trailer bunk according to claim 1 wherein an interaction between the serrated portion of the non-rotationally adjustable base plate and the serrated interior surface of the support housing only vertically retain the non-rotationally adjustable base plate relative to the support housing.

5. The adjustable aluminum trailer bunk according to claim 1 wherein the pivotal aluminum rail further comprising a first web extending radically from the cylindrical housing connecting to a second web positioned adjacent to an interior surface of the support tabular member.

6. The adjustable aluminum trailer bunk according to claim 1 wherein the base, the first wall, and the second wall are configured in a substantially triangular shape, wherein a first upper wall extends substantially vertical from the first wall, wherein a second upper wall extends substantially vertical from the second wall each of the first and second upper walls have a serrated interior surface that mechanically engages with the serrated portion of the non-rotationally adjustable base plate.

7. The adjustable aluminum trailer bunk according to claim 1 wherein the protective covering comprises Santoprene.

8. The adjustable aluminum trailer bunk according to claim 1 wherein the protective covering is an extrusion.

9. The adjustable aluminum trailer bunk according to claim 1 wherein the pivotal aluminum rail comprises (i) a bottom plate, (ii) a support member located at a first end of the bottom plate, and (iii) an end wall located at a second end of the bottom plate, wherein the end wall extends substantially vertical from the bottom plate.

10. The adjustable aluminum trailer bunk according to claim 9 wherein the pivotal aluminum rail further comprises at least one fin located between the support member and the end wall, wherein the at least one fin extends substantially vertically from the bottom plate.

11. The adjustable trailer bunk according to claim 1 wherein the protective covering comprises a glow in the dark additive for increased visibility of the pivotal aluminum rail during low light conditions.

12. The adjustable aluminum trailer brink comprising:
  a support housing comprising a base, a first wall and a second wall, each of the first and second walls extend substantially vertical to define a hollow interior having an open top, each of the first and second walls have a serrated interior surface and at least one corresponding aperture that is adapted to receive a bolt;
  a non-rotationally adjustable base plate comprising (i) a first end and a second end, (ii) an enlarged cylindrical head being connected at the first end, and (iii) a serrated portion extending from the enlarged cylindrical head to the second end, wherein the serrated portion configured to be received into the hollow interior when the serrated portion is mechanically engaged with the serrated interior surface of the support housing;
  a pivotal aluminum rail comprising (i) a cylindrical housing that is connected to an upper portion having a bottom plate, (ii) a support member located at a first end of the bottom plate, and (iii) an end wall located at a second end of the bottom plate, wherein the end wall extends substantially vertical from the bottom plate, wherein the cylindrical housing being configured to receive the enlarged cylindrical head of the non-rotationally adjustable base plate to form a pivotal connection between the pivotal aluminum rail and the support housing; and
  a protective covering placed substantially over the support member and the end wall of the pivotal aluminum rail.

13. The adjustable aluminum trailer bunk according to claim 12 wherein the pivotal aluminum rail further comprises at least one fin located between the support member and the end wall, wherein the at least one fin extends substantially vertical from the bottom plate.

14. The adjustable aluminum trailer bunk according to claim 12 wherein the support member is an angular gusset.

15. The adjustable aluminum trailer bunk according to claim 12 further comprising a web that connects the upper portion to the cylindrical housing.

16. The adjustable aluminum trailer bunk according to claim 12 wherein each of the support housing, the base plate, and the pivotal aluminum rail is an Aluminum Association's 6XXX series of aluminum alloys.

17. The adjustable aluminum trailer bunk according to claim 16 wherein each of the support housing, the base plate, and the pivotal aluminum rail is an extrusion, a casting, or a forging.

* * * * *

UNITED STATES PATENT AND TRADEMARK OFFICE
CERTIFICATE OF CORRECTION

PATENT NO.         : 7,581,745 B2
APPLICATION NO.    : 11/473316
DATED              : September 1, 2009
INVENTOR(S)        : Philip Remedios et al.

It is certified that error appears in the above-identified patent and that said Letters Patent is hereby corrected as shown below:

On the title page, Assignee item (73), delete "Alcoa Inc." and insert --Sapa Extrusions, Inc.--

Signed and Sealed this

Thirteenth Day of October, 2009

David J. Kappos
*Director of the United States Patent and Trademark Office*